United States Patent [19]
Bouyer

[11] 3,796,275
[45] Mar. 12, 1974

[54] DRIVING DEVICE FOR POWERED VEHICLES, AND MORE PARTICULARLY TO LAWN-MOWER VEHICLES

[76] Inventor: Jean Félix Henri Bouyer, 12-14, Bld Jean-Jaures, Tomblaine, France

[22] Filed: Apr. 28, 1972

[21] Appl. No.: 248,619

[30] Foreign Application Priority Data
June 8, 1971 France .............................. 71.20667

[52] U.S. Cl.................. 180/6.4, 180/6.2, 180/77 H, 74/217 S, 74/242.1 R
[51] Int. Cl............................................. B62d 11/08
[58] Field of Search ......... 180/6.2, 6.24, 6.26, 6.32, 180/6.4, 77 H; 74/217 S, 242.1 R, 242.1 A, 242.1 TA, 242.1 FA

[56] References Cited
UNITED STATES PATENTS

| | | | |
|---|---|---|---|
| 2,989,134 | 6/1961 | Kamlukin et al. | 180/77 H |
| 637,015 | 11/1899 | O'Donnell | 180/6.32 |
| 3,057,216 | 10/1962 | Smith | 74/242.1 R X |
| 1,479,092 | 1/1924 | Springer | 180/6.24 |
| 2,765,860 | 10/1956 | Church | 180/6.4 |
| 3,180,305 | 4/1965 | Gower-Rempel | 180/77 H X |
| 3,598,194 | 8/1971 | Wappler et al. | 180/6.2 |
| 2,051,289 | 8/1936 | Custer | 74/217 S X |
| 3,216,266 | 11/1965 | Sunnen | 74/242.1 R X |

*Primary Examiner*—David Schonberg
*Assistant Examiner*—Leslie J. Paperner
*Attorney, Agent, or Firm*—McGlew and Tuttle

[57] ABSTRACT

The driving device includes a pair of coaxial driving pulleys, of respective different diameters, driven directly by the motor of the vehicle, and a driven pulley connected to a shaft in turn connected, by respective coupling means, to a pair of rear driving wheels. The vehicle includes a dirigible front steering wheel. Each driving pulley has a respective endless belt trained therearound and arranged to drive the driven pulley. A single control lever is pivoted, intermediate its ends, for swinging about mutually perpendicular first and second axes, the first axis extending transversely of the vehicle and the second axis extending longitudinally of the vehicle. The lower, or operating, end of the single control lever is connected to a pair of tensioning pulleys each cooperable with a respective endless belt. When the lever is swung, from a neutral position, in one direction about the first axis, one endless belt is tensioned to drive the driven pulley and, when the lever is swung in the opposite direction about the first axis, the other endless belt is effective to drive the driven pulley. On one embodiment of the invention, each endless belt drives the driven pulley at a respective different forward speed and, in another embodiment of the invention, one endless belt drives the driven pulley at a respective forward speed and the other endless belt drives the driven pulley at a respective reverse speed. A cable, trained over pulleys, connects the operating end of the control lever to the dirigible wheel so that, as the control lever is swung in either direction about the second axis, the dirigible wheel is steered in a corresponding direction. Link means connect the single control lever to the driven axle to shift the same paraxially and, responsive to the control lever being swung to make a tight turn, the linkage means, through the driven shaft, disengages the coupling means connecting the driven shaft to the rear driving wheel then on the inside of the tight turn.

5 Claims, 9 Drawing Figures

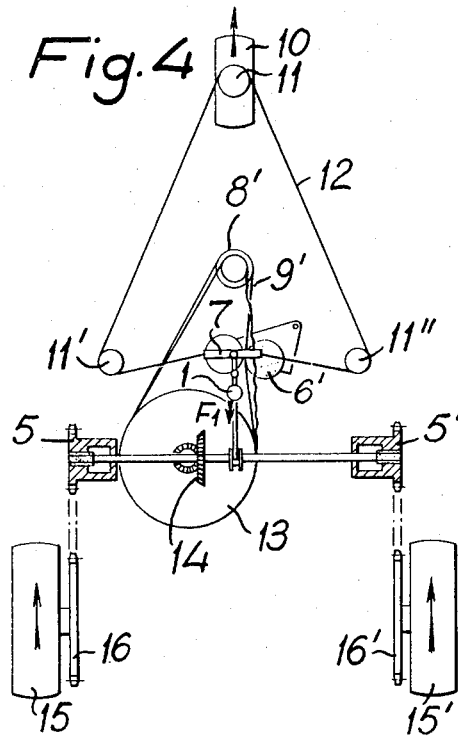
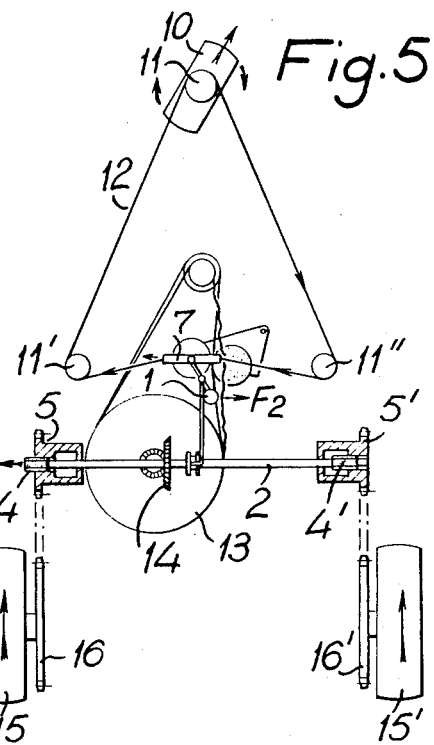
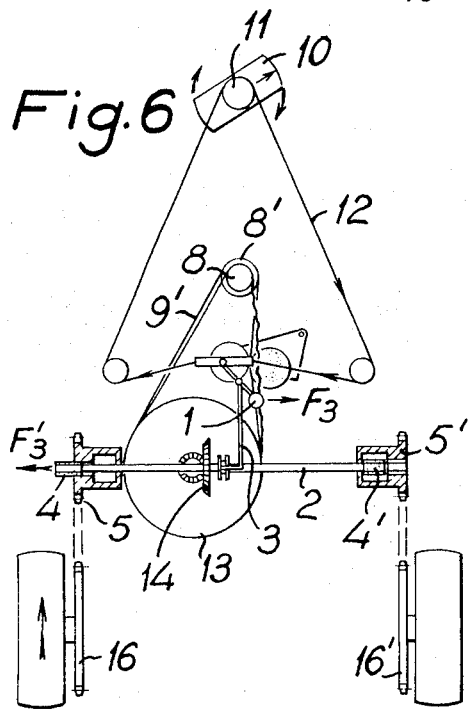
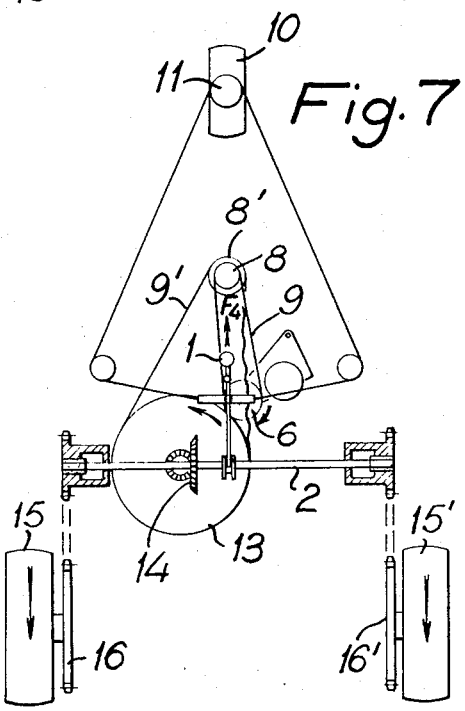

3,796,275

DRIVING DEVICE FOR POWERED VEHICLES, AND MORE PARTICULARLY TO LAWN-MOWER VEHICLES

FIELD AND BACKGROUND OF THE INVENTION

The present invention relates to powered-vehicle driving means, and more specifically to a driving device having a single manually operated control lever which can be tilted in different directions to occupy a determinate number of positions in each of which it performs one or more functions relating to the nature of the motion, the speed and the steering of the vehicle.

Applications: for driving small, powered mechanical-handling, transport or farm vehicles, and more particularly lawn-mower vehicles.

SUMMARY OF THE INVENTION

While the present invention relates to a driving device for powered vehicles and more particularly for powered lawn-mower vehicles, it is to be clearly understood that the arrangements set forth hereinafter are applicable likewise to all powered vehicles or devices requiring to be steered, and that they can be used on all farm, handling or transport machinery.

The many advantages offered by the device according to this invention include outstanding manoeuvrability and great ease of driving on all vehicles on which it is utilized, since it dispenses with pedals and other controls. In addition, its simplicity results in a very low production cost. Lastly, it provides appreciable safety in each type of motion, that is to say for travel motion and for steering.

A driving device according to this invention for driving a powered vehicle having a front dirigible or steering wheel and two rear driving wheels is characterized in that it includes a single manually operated lever which can be tilted in different directions to occupy a determinate number of positions in each of which it performs one or more functions relating to the type of motion, the speed and the steering of the vehicle, at least one driving pulley coupled to a driven pulley by a drive belt adapted to be tensioned by means of a roller cooperating with the lever, further means provided to transmit the rotation of said driven pulley to a shaft and from the shaft to one or both driving wheels, means being provided to disengage the drive to one of the wheels during tight turns, and the position of the front steering wheel being controllable by means of cables and rollers from the lever.

In one preferred embodiment of the invention, the device is designed for two forward speeds.

In an alternative embodiment, the subject device of the invention provides a single forward speed and reverse.

BRIEF DESCRIPTION OF THE DRAWING

Further particularities and advantages of the present invention will become more clearly apparent from the description which follows with reference to the accompanying non-limitative exemplary drawings, in which:

FIG. 4 is a plan view of the device of FIG. 2, the control lever being shown in its position for engaging second gear;

FIG. 5 is a plan view of the device of FIG. 2, the control lever being shown in its position for engaging second gear and for steering a wide curve to the right;

FIG. 6 is a plan view of the device of FIG. 2, the control lever being shown in its position for engaging second gear and for steering a tight turn to the right;

FIG. 7 is a plan view of an alternative embodiment of the device according to the invention, having one forward gear and a reverse gear, the control lever being shown in its position for engaging reverse gear;

DESCRIPTION OF THE PREFERRED EMBODIMENTS

Figure 1:
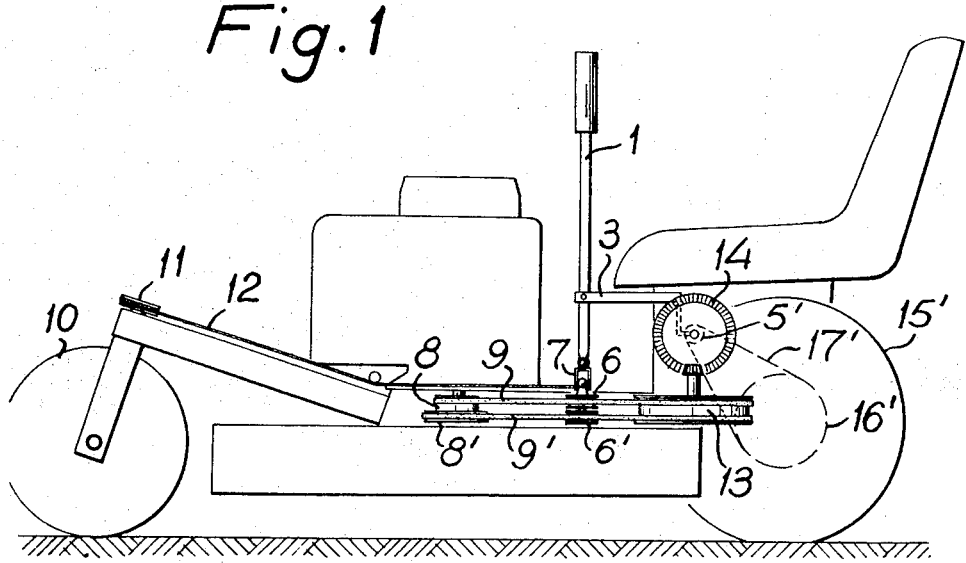
FIG. 1 is a schematic side elevation view of a powered lawn-mower vehicle incorporating the driving device according to this invention.

Reference to FIG. 1 shows that the driving device according to the invention comprises a lever 1 which is articulated at its lower end and terminates in a clevis 7. Coaxially mounted on the engine shaft are two pulleys 8 and 8', corresponding respectively to first and second gears. These pulleys are coupled to a driven pulley 13 by respective drive belts 9 and 9' which, through the agency of tensioning rollers 6 and 6', can be tensioned in turn by moving the lever 1. The rotation of driven pulley 13 is transmitted to a shaft 2 through bevel gearing 14 and thence to the wheels 15' by means of driving sprockets 5' and chains 17'. The dirigible wheel 10 is controlled by the lever 1 through the agency of a pulley 11, pulleys 11' and 11" (not shown in FIG. 1) and a cable 12. Lastly, a link 3 fast with lever 1 allows the shaft 2 to be translated in order to release the drive to one of the rear driving wheels when the vehicle makes a tight turn.

Figure 2:
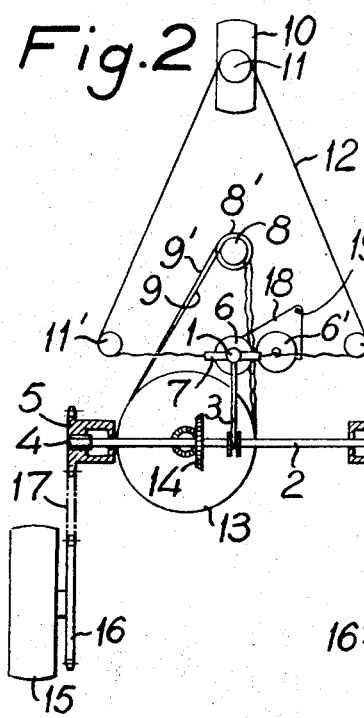
FIG. 2 is a plan view of an embodiment of the device according to the invention with two forward speeds, the control lever being in its neutral position.

FIG. 2 is a plan view showing the driving device of this invention, the single control lever 1 being depicted in its neutral position. It is to be noted that the vehicle incorporating the device according to the invention may include a brake adapted to become operative as soon as the control lever is released. In the configuration shown in FIG. 2, the brake is therefore operative. Lever 1 is in the vertical position. The shaft 2 actuated by the link 3 is in its central position, that is to say that the stubs 4 and 4' of shaft 2 are drivingly engaged in sprockets 5 and 5'. The tensioning rollers 6 and 6', which are mounted in different planes on a triangular plate 18 capable of pivoting about a pin 19 and of being pivoted by the clevis 7, neutralize the drive imparted by drive belts 9 and 9', respectively.

Figure 3:
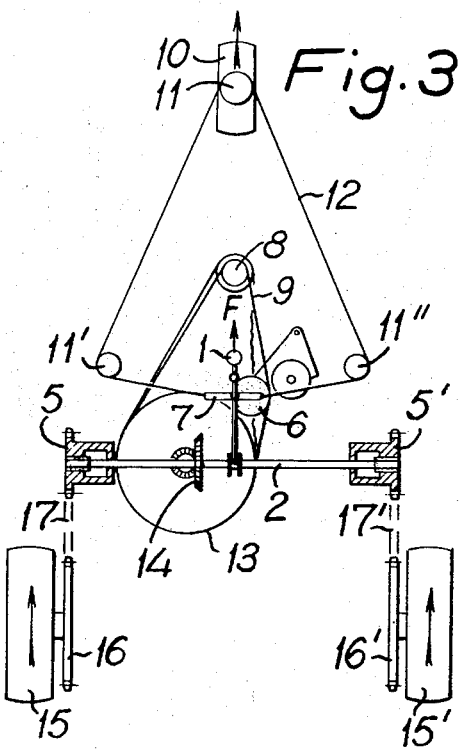
FIG. 3 is a plan view of the device of FIG. 2, the control lever being shown in its position for engaging first gear.

FIG. 3 shows the device in the position for engaging first forward gear with the steering wheel straight. Lever 1 is pushed forward in the direction of arrow F.

Tensioning roller 6 engages with belt 9 to cause the same to impart drive. Driving pulley 8 accordingly drives the driven pulley 13 which in turn rotates drive shaft 2 through the medium of bevel coupling 14, thereby causing the driving wheels 15 and 15' to rotate for forward motion through the agency of driving sprockets 5 and 5' which in turn drive the sprocket wheels 16 and 16' through driving chains 17 and 17'. The front wheel 10 remains in its axially aligned position.

FIG. 4 shows the driving device in the position for engaging second forward speed with the steering wheel straight. Lever 1 has been pulled back in the direction of arrow $F_1$ and causes its clevis 7 to move the roller 6' into the position in which drive is imparted through the belt 9'. Driving pulley 8' accordingly drives pulley 13 to cause the vehicle to travel forward, all other parts remaining in the same position as in FIG. 3.

FIG. 5 depicts the vehicle in the configuration for forward travel in second gear with its front wheel deflected for a wide curve to the right, drive being imparted through both rear wheels. Lever 1 is in the position for engaging second forward gear (pulled back, to give forward travel motion) and is tilted in a first rightward position (arrow $F_2$). Responsively to link 3, shaft 2 has been shifted leftwardly (arrow $F_2'$), whereby the splined stubs 4 and 4' are shifted within driving sprockets 5 and 5', which continue to be drivingly engaged so that the two rear wheels 15 and 15' continue to impart drive to the vehicle.

The front steering or dirigible wheel 10 has been deflected rightwardly in response to pulley 11, the latter having been rotated by the cable 12 which runs over pulleys 11' and 11'' and is actuated by the clevis 7 which, by virtue of the rightward tilt imparted to lever 1, has been translated leftwardly.

FIG. 6 shows the vehicle in the configuration for forward travel motion in second gear with the front wheel deflected for a tight rightward turn, the drive to the right-hand rear wheel having been released while being maintained in the left-hand rear wheel. Lever 1 is in its position for engaging second forward gear (pulled back, to impart forward travel to the vehicle) and is tilted fully to the right (arrow $F_3$). Responsively to link 3, shaft 2 has been shifted left-wardly, thereby shifting the stubs 4 and 4' leftwardly within driving sprockets 5 and 5'. The splined stub 4' has emerged from the sprocket 5' which drives the wheel 15' whereby to disengage the drive thereto. Splined stub 4 remains drivingly engaged in the sprocket 5 which drives the wheel 15, which is now the only wheel through which drive is imparted to the vehicle. The front steering wheel 10 is fully deflected to the right in response to pulley 11, which has been rotated by the cable 12, which cable has in turn been actuated by lever 1.

It goes without saying that the movements of the lever 1 between its different limit positions are made gradually.

The subject device of this invention has been described hereinabove as applied to the case of a vehicle having two forward speeds and described as negotiating a wide curve to the right or a tight turn to the right. Manifestly, however, the single control lever may be pulled back and then gradually tilted leftwardly to negotiate either a wide leftward turn or a tight leftward turn in second forward gear. Equally, the single control lever may be pushed forward and then gradually tilted rightwardly or leftwardly to permit a wide turn to the right or the left respectively, or a tight turn in first gear.

In accordance with an alternative embodiment of the invention, only one forward gear and reverse are provided.

FIG. 7 illustrates such a device. As described precedingly, the drive belt 9' runs over the driving pulley 8' and drives the driven pulley 13 (in the case of forward travel with the control lever pulled back). When lever 1 is pushed forward (arrow $F_4$) its clevis 7 moves the tensioning roller 6 into the position for causing drive to be transmitted to the belt 9 which runs over driving pulley 8 and roller 6. Driving pulley 8 accordingly drives the roller 6 which causes the back of belt 9 to contact driven pulley 13, thereby causing pulley 13 to rotate the shaft 2 in reverse through bevel coupling 14. The steering wheel 10 is in its axially aligned position and the drive to the wheels 15 and 15' is transmitted as described precedingly.

By comparison with prior art devices, the subject device of this invention ensures total adhesion of both driving wheels to the ground, both when travelling in a straight line and when negotiating wide curves. For tighter turns, the outer driving wheel is allowed to rotate at the same speed, which speed is not multiplied as it would be if a conventional differential gearing were provided.

As explained precedingly, the means for engaging and releasing the drive from the drive shaft to the driving wheels during tight turns are formed by dog-clutches positioned at the stub end of shaft 2, which shaft can be translated by the single control lever through rigid linkage formed by the link 3. However, this arrangement presents a slight disadvantage when it is required to return the steering wheel 10 into a straight line after a turn, since this can be done only after the drive to the wheel has been re-engaged, that is to say after the time required for the matching splines to register with one another. In accordance with the alternative embodiment shown in FIGS. 8 and 9, recourse is had to a different drive sequence that overcomes this drawback, it being possible to return the steering wheel into a straight line immediately without having to wait for the drive to the wheel to be reengaged.

Figure 8:
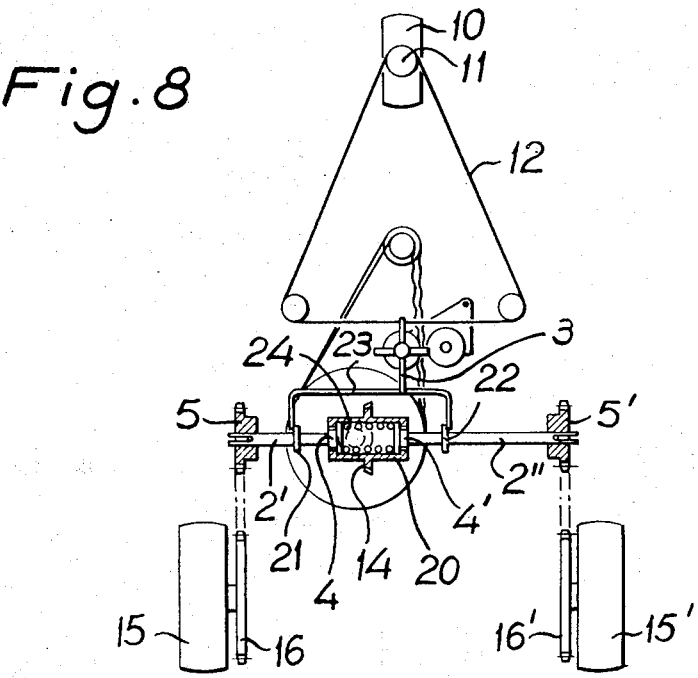
FIG. 8 is a plan view of still another embodiment of the device according to the invention, incorporating means for releasing the drive to one of the driving wheels.

Reference is next had to FIG. 8 in which the shaft 2 is replaced by two half-axles 2' and 2'', the outer end of each of which is slotted to take a rod adapted to angularly unite the half-axle 2' (or 2'') with sprocket 5 (or 5') while permitting translation motion thereof. The splined ends 4 and 4' are transferred to the inner ends of the half-axles and are housed in a cylindrical case 20 fast with bevel gearing 14. Compressed within case 20 is a spring 24 the ends of which react against two thrust washers fixed to said splined ends respectively. The end-faces of case 20 carry the dog-clutches. The two half-axles support discs 21 and 22, respectively, which are normally in contact with a yoke 23 fast with link 3.

Figure 9:
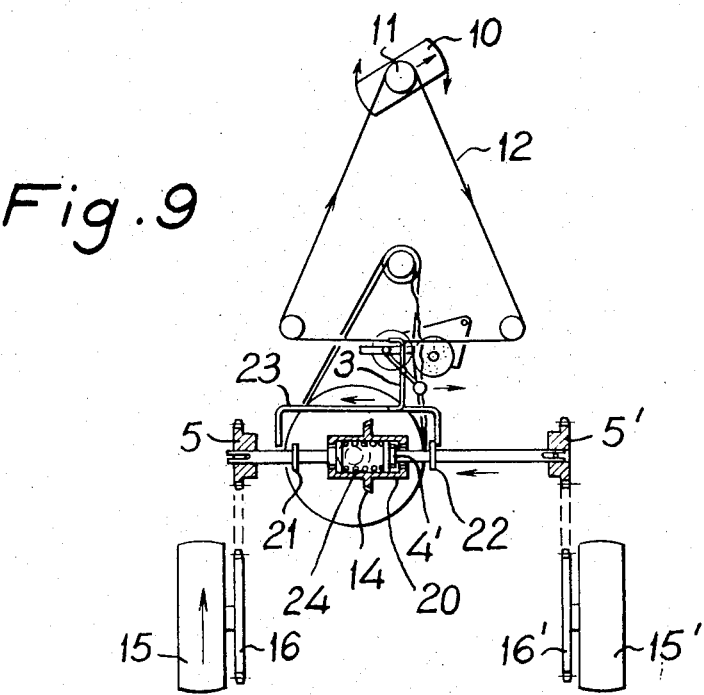
FIG. 9 is a plan view of the device incorporating the means according to the alternative embodiment of FIG. 8, the control lever being shown in its position for engaging second gear and for steering a tight turn to the right.

Reference is lastly had to FIG. 9 for a showing of the device in the position for engaging second gear and for making a tight turn to the right. The single control lever was first pulled back (for engagement of second gear), then tilted fully to the right (for a tight rightward turn), whereby yoke 23 was translated leftwardly and through the agency of disc 22 disengaged the drive to wheel 15', the spring 24 within cylindrical case 20 being compressed. After the turn, steering wheel 10 is returned into a straight line by tilting the single control lever over to the left while maintaining it pulled back. This operation can be done immediately, and the drive to the wheel 15' is thereafter engaged automatically under the bias of spring 24 as soon as the splines come into registry.

What I claim is:

1. A driving device for a vehicle powered by a motor and having a front dirigible wheel and two rear driving wheels comprising, in combination, a driven shaft; respective coupling means connecting said driven shaft to said two rear driving wheels; a driven member coupled to said driven shaft; first and second drive means driven by said motor and operable to drive said driven member at first and second respective different speeds; a single control lever pivotal, intermediate its ends, about first and second mutually perpendicular axes and having an operating end coupled to said first and second drive means; said control lever having a neutral position effectively uncoupling both drive means from said driven member, and being swingable about said first axis in one direction, to effectively couple said first drive means to said driven member for operation of the vehicle at the first speed, and in the opposite direction, to effectively couple said second drive means to said driven member for operation of the vehicle at the second speed; pulley and cable means connecting the operating end of said control lever to said dirigible wheel for steering of said dirigible wheel responsive to swinging of said control lever about said second axis; and means connecting said control lever to said driven shaft and operable to shift said driven shaft paraxially responsive to swinging of said lever about said second axis, said last-named means, responsive to said control lever steering said dirigible wheel to make a tight turn, operating, through said driven shaft, to disengage the coupling means connecting said driven shaft to the rear driving wheel then on the inside of such tight turn.

2. A driving device, as claimed in claim 1, in which said first and second drive means comprises first and second coaxial driving pulleys having respective different diameters and driven by said motor, and first and second drive belts turned around said first and second drive pulleys, respectively, and said driven pulley; and first and second tension rollers connected to the operating end of said control lever and respectively engageable with said first and second drive belts to tension the latter upon movement of said control lever from its neutral position to drive the vehicle at respective different speeds.

3. A driving device, as claimed in claim 1, in which said last-named means comprises a link secured to said single control lever and engaged with said driven shaft to shift the same paraxially; said respective coupling means comprising splined stub ends of said driven shaft engaged in respective splined sprocket wheels connected to said rear driving wheels.

4. A driving device, as claimed in claim 1, in which said last-named means comprises a rod secured to said control lever and a yoke secured to said rod; said driven shaft comprising two half-shafts each secured with a respective sprocket connected to a respective rear driving wheel; respective discs on each half-axle engageable by said yoke whereby, upon swinging of said control lever about said second axis, a respective one of said half-shafts is shifted paraxially; a cylindrical case secured to a bevel gear engageable with a meshing bevel gear secured to a driven pulley constituting said driven member; respective dog-clutches secured to the end walls of said cylindrical case; and respective splined stubs on said half-shafts cooperable with the associated dog-clutches; and a spring in said cylindrical case interposed between said splined stubs.

5. A driving device, as claimed in claim 1, in which said first and second drive means comprises two coaxial driving pulleys of respective different diameters driven by said motor; said driven member comprising a driven pulley; a first endless belt connecting said first driving pulley to said driven pulley; first and second tensioning pulleys connected to the operating end of said control lever for operation thereby; said first tensioning pulley, responsive to said control lever being swung about said first axis in one direction, tensioning said first endless belt to effectively couple said first driving pulley to said driven pulley for operation of the vehicle in a forward direction at the first speed; a second endless belt connecting said second driving pulley to said second tensioning pulley; said control lever, when swung around about said first axis in the opposite direction, engaging the outer surface of said second endless belt into driving connection with said driven pulley to operate the vehicle in the reverse direction at the second speed.

* * * * *